United States Patent
Wang et al.

(10) Patent No.: US 11,022,765 B2
(45) Date of Patent: Jun. 1, 2021

(54) LENS CLIP FOR COUPLING AND OPTICAL ALIGNMENT OF AN OPTICAL LENS AND AN OPTICAL SUBASSEMBLY MODULE IMPLEMENTING SAME

(71) Applicant: Applied Optoelectronics, Inc., Sugar Land, TX (US)

(72) Inventors: Chong Wang, Stafford, TX (US); Qin Li, Houston, TX (US); Hsiu-Che Wang, Rosenberg, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 87 days.

(21) Appl. No.: 16/246,853

(22) Filed: Jan. 14, 2019

(65) Prior Publication Data
US 2020/0225427 A1 Jul. 16, 2020

(51) Int. Cl.
*G02B 6/42* (2006.01)

(52) U.S. Cl.
CPC ......... *G02B 6/4244* (2013.01); *G02B 6/4239* (2013.01); *G02B 6/4246* (2013.01)

(58) Field of Classification Search
None
See application file for complete search history.

(56) References Cited

U.S. PATENT DOCUMENTS

| | | | | |
|---|---|---|---|---|
| 5,615,052 A * | 3/1997 | Doggett | ............... | G01N 21/274 359/642 |
| 5,758,950 A * | 6/1998 | Naoe | .................... | G02B 6/4204 362/259 |
| 6,782,028 B2 * | 8/2004 | Tsukiji | .................. | B82Y 20/00 372/50.1 |
| 2003/0044132 A1 * | 3/2003 | Nasu | .................. | H01S 5/02208 385/92 |
| 2015/0177474 A1 * | 6/2015 | Tsuzuki | ............... | G02B 6/4237 385/33 |
| 2017/0017051 A1 * | 1/2017 | Kaneko | .................. | G02B 7/021 |

* cited by examiner

*Primary Examiner* — Chad H Smith
(74) *Attorney, Agent, or Firm* — Grossman Tucker Perreault & Pfleger, PLLC; Norman S. Kinsella

(57) ABSTRACT

The present disclosure is generally directed to a lens clip that includes an optical lens slot to securely hold an optical lens at a predetermined position to mitigate effects of post-annealing shift. The lens clip includes a base that provides at least one substrate mating surface for mounting to a substrate, and at least first and second arms extending from the base. The first and second arms extend substantially parallel relative to each other and define at least a portion of an optical lens slot. The optical lens slot is configured to receive at least a portion of an optical lens and securely hold the optical lens at a predetermined position to ensure optical alignment of the optical lens, e.g., relative to an associated laser diode or other optical component, during fixation of the optical lens to the substrate using, for instance, UV-curing optical adhesives.

16 Claims, 4 Drawing Sheets

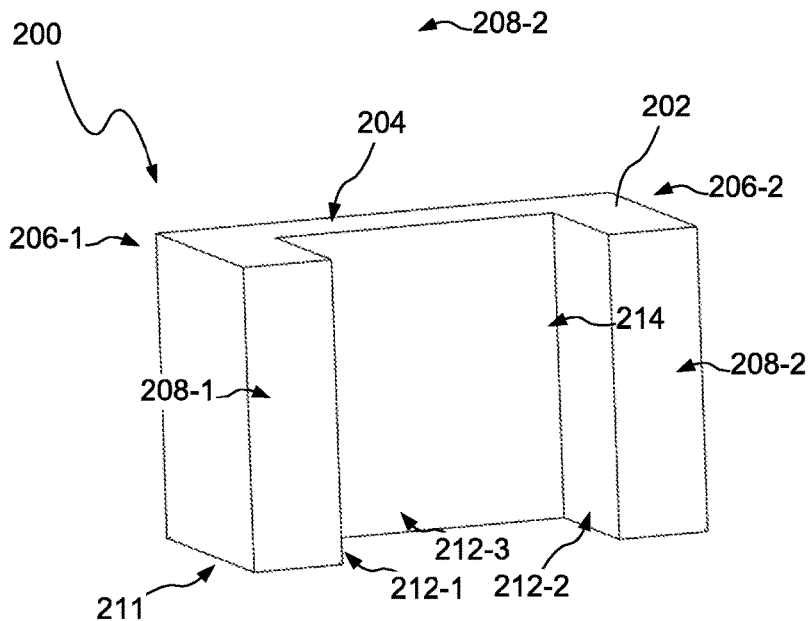
FIG. 2
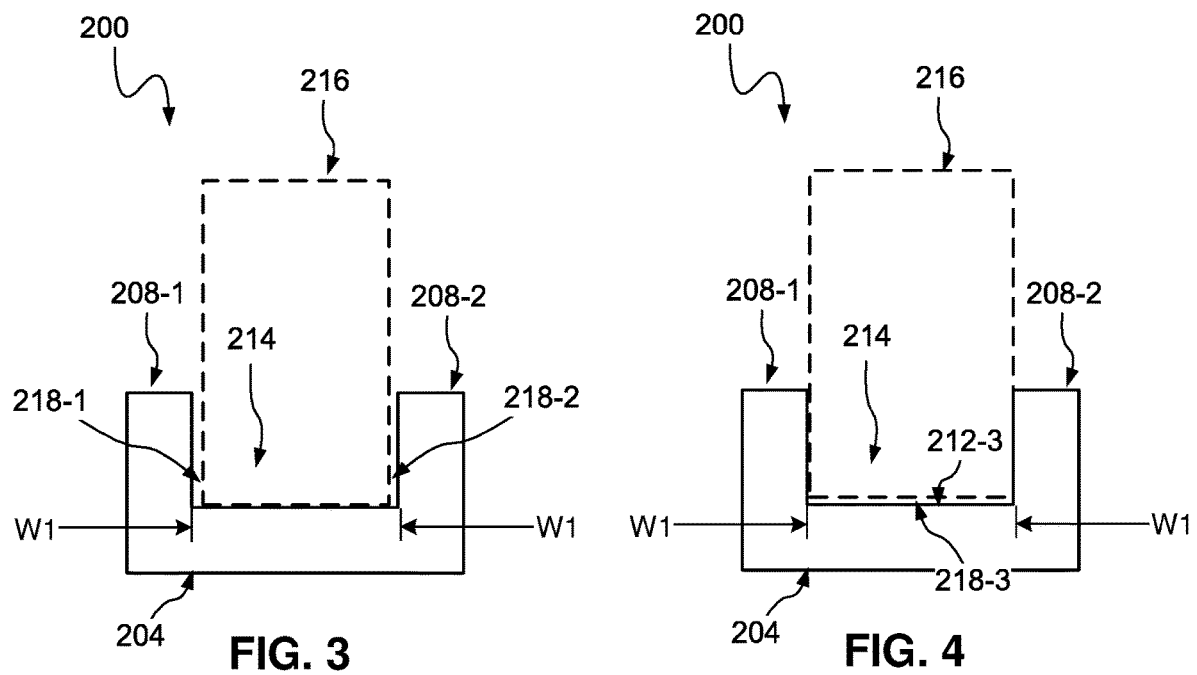
FIG. 3   FIG. 4

LENS CLIP FOR COUPLING AND OPTICAL ALIGNMENT OF AN OPTICAL LENS AND AN OPTICAL SUBASSEMBLY MODULE IMPLEMENTING SAME

TECHNICAL FIELD

The present disclosure relates to optical communications, and more particularly, to a lens clip that maintains optical alignment of an associated optical lens relative to an optical component, e.g., a laser diode, to minimize or otherwise reduce the impact of post-annealing shift that occurs when using, for example, ultraviolet-curing (UV-curing) optical adhesives.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher transmit/receive speeds in increasingly space-constrained optical transceiver modules has presented challenges, for instance, with respect to establishing and maintaining proper orientation and alignment of optical components during manufacturing.

Optical transceiver modules generally include one or more transmitter optical subassemblies (TOSAs) for transmitting optical signals. TOSAs can include one or more lasers to emit one or more channel wavelengths and associated passive and/or active supporting components. Such supporting components include, for example, laser diode drivers (LDDs), focusing lenses, and multiplexing devices (e.g., arrayed waveguide grating (AWG)). Each component may be securely attached to a housing/substrate at predefined positions relative to each other to assemble a TOSA. For instance, components such as a laser diode and AWG may be die bonded adjacent one or more laser diodes. On the other hand, components such as focusing lenses may be attached using adhesives such as UV-curing optical adhesives. However, such adhesives can cause misalignment of components, which is known as post-annealing shift, which results from the structural changes to an adhesive as it cures/hardens. For instance, UV-curing optical adhesives "shrink" in response to exposure to UV light. This shrinkage introduces displacement that can shift a component out of optical alignment, which can ultimately reduce yield.

BRIEF DESCRIPTION OF THE DRAWINGS

These and other features and advantages will be better understood by reading the following detailed description, taken together with the drawings wherein:

FIG. 2 shows a perspective view of a lens clip suitable for use in the optical transceiver of FIG. 1, in accordance with an embodiment of the present disclosure.

FIG. 3 shows an example top-down view of the lens clip of FIG. 2 in accordance with an embodiment of the present disclosure.

FIG. 4 shows another example top-down view of the lens clip of FIG. 2 in accordance with an embodiment of the present disclosure.

DETAILED DESCRIPTION

Figure 1:
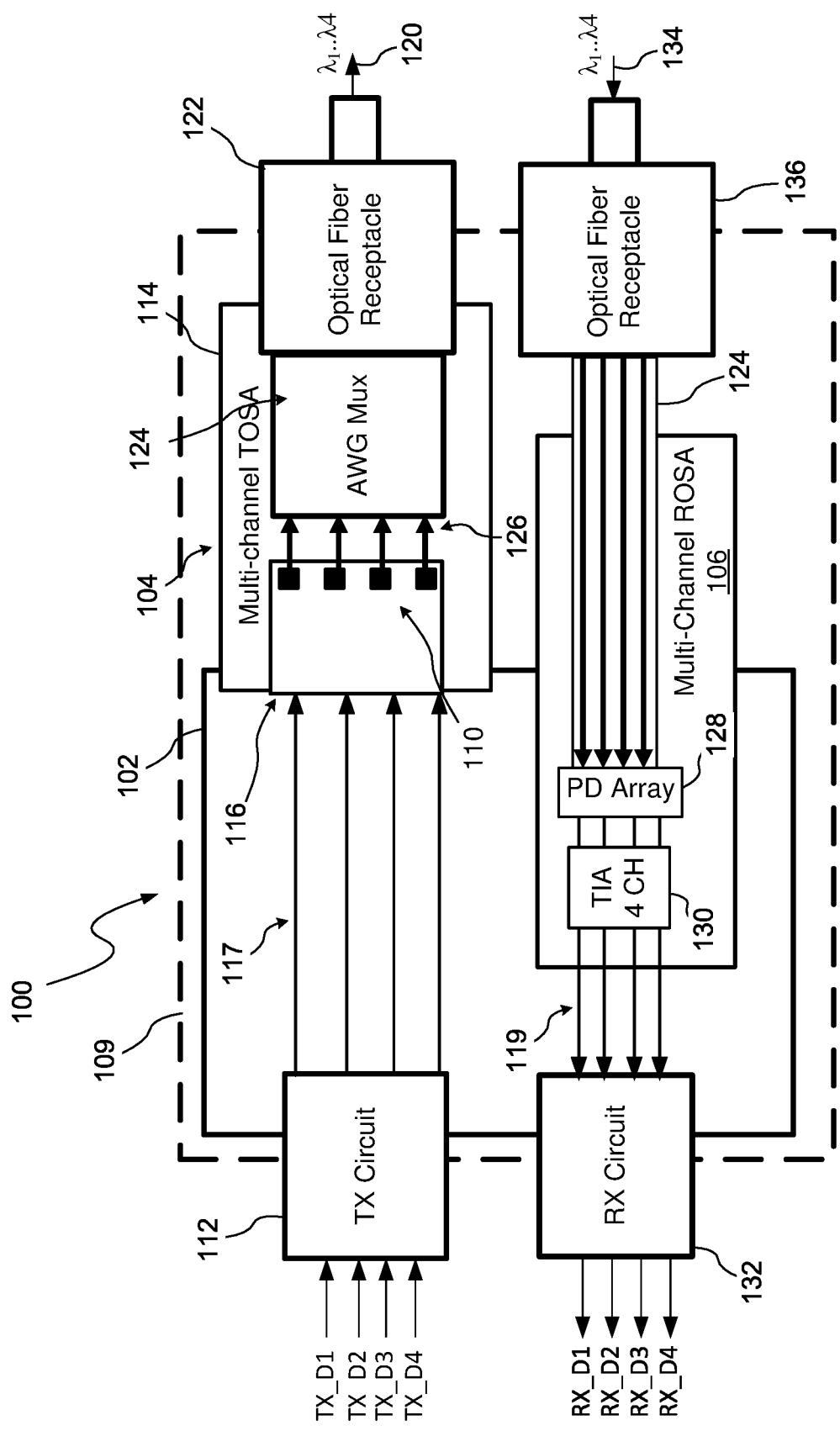
FIG. 1 shows a block diagram of a multi-channel optical transceiver in accordance with an embodiment of the present disclosure.

The present disclosure is generally directed to a lens clip that includes an optical lens slot to securely hold an optical lens at a predetermined position to minimize or otherwise reduce effects of post-annealing shift. In an embodiment, the lens clip includes a base defined by at least one substrate mating surface for mounting to a substrate, and a plurality of sidewalls that define at least first and second arms that extend from the base. The first and second arms extend substantially parallel relative to each other and define at least a portion of an optical lens slot. The optical lens slot is configured to receive at least a portion of an optical lens and securely hold the optical lens at a predetermined position, e.g., using a friction fit, to ensure optical alignment of the optical lens relative to an associated optical component, e.g., a laser diode, during fixation of the optical lens to the substrate using, for instance, UV-curing optical adhesives.

While the present disclosure includes examples and scenarios directed specifically to a lens clip being used in a transmitter optical subassembly (TOSA) arrangement, this disclosure is not limited in this regard. For example, a lens clip consistent with the present disclosure may be utilized to align and mount optical lenses in receiver optical subassembly (ROSA) arrangements.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM.

The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. On the other hand, the term "direct optical coupling" refers to an optical coupling via an optical path between two elements that does not include such intermediate components or devices, e.g., a mirror, waveguide, and so on, or bends/turns along the optical path between two elements.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated characteristic. To provide one non-limiting numerical example to quantify "substantially," minor variation may cause a deviation of up to and including ±5% from a particular stated quality/characteristic unless otherwise provided by the present disclosure.

Referring to the Figures, FIG. 1, an optical transceiver 100, consistent with embodiments of the present disclosure, is shown and described. In this embodiment, the optical transceiver 100 includes a multi-channel transmitter optical subassembly (TOSA) arrangement 104 and a multi-channel receiver optical subassembly (ROSA) arrangement 106 coupled to a substrate 102, which may also be referred to as an optical module substrate. The substrate 102 may comprise, for example, a printed circuit board (PCB) or PCB assembly (PCBA). The substrate 102 may be configured to be "pluggable" for insertion into an optical transceiver cage 109.

In the embodiment shown, the optical transceiver 100 transmits and receives four (4) channels using four different channel wavelengths ($\lambda 1$, $\lambda 2$, $\lambda 3$, $\lambda 4$) via the multi-channel TOSA arrangement 104 and the multi-channel ROSA arrangement 106, respectively, and may be capable of transmission rates of at least about 25 Gbps per channel. In one example, the channel wavelengths $\lambda 1$, $\lambda 2$, $\lambda 3$, $\lambda 4$ may be 1270 nm, 1290 nm, 1310 nm, and 1330 nm, respectively. Other channel wavelengths are within the scope of this disclosure including those associated with local area network (LAN) wavelength division multiplexing (WDM). The optical transceiver 100 may also be capable of transmission distances of 2 km to at least about 10 km. The optical transceiver 100 may be used, for example, in internet data center applications or fiber to the home (FTTH) applications. Although the following examples and embodiments show and describe a 4-channel optical transceiver, this disclosure is not limited in this regard. For example, the present disclosure is equally applicable to 2, 6, or 8-channel configurations.

In more detail, the multi-channel TOSA arrangement 104 includes a TOSA housing 114 with a plurality of sidewalls that define a cavity (not shown). The cavity includes a plurality of laser arrangements 110 disposed therein, with each laser arrangement including a lens clip 200 to securely hold and align an optical lens with an associated laser diode during fixation, which will be discussed in greater detail below with regard to FIGS. 2-7. In an any event, each laser arrangement of the plurality of laser arrangements 110 can be configured to transmit optical signals having different associated channel wavelengths. Each laser arrangement may include passive and/or active optical components such as a laser diode (LD), monitor photodiode (MPD), laser diode driver (LDD), and so on. Additional components comprising each laser arrangement include filters, optical isolators, filtering capacitors, and so on.

To drive the plurality of laser arrangements 110, the optical transceiver 100 includes a transmit connecting circuit 112 to provide electrical connections to the plurality of laser arrangements 110 within the housing 114. The transmit connecting circuit 112 may be configured to receive driving signals (e.g., TX_D1 to TX_D4) from, for example, circuitry within the optical transceiver cage 109. The housing 114 may be hermetically sealed to prevent ingress of foreign material, e.g., dust and debris. Therefore, a plurality of transit (TX) traces 117 (or electrically conductive paths) may be patterned on at least one surface of the substrate 102 and are electrically coupled with a feedthrough device 116 of the TOSA housing 114 to bring the transmit connecting circuit 112 into electrical communication with the plurality of laser arrangements 110, and thus, electrically interconnect the transmit connecting circuit 112 with the multi-channel TOSA arrangement 104. The feedthrough device 116 may comprise, for instance, ceramic, metal, or any other suitable material.

In operation, the multi-channel TOSA arrangement 104 may then receive driving signals (e.g., TX_D1 to TX_D4), and in response thereto, generates and launches multiplexed channel wavelengths on to an output waveguide 120 such as a transmit optical fiber. The generated multiplexed channel wavelengths may be combined based on a demultiplexing device 124 such as an arrayed waveguide grating (AWG) that is configured to receive emitted channel wavelengths 126 from the plurality of laser assemblies 110 and output a signal carrying the multiplexed channel wavelengths on to the output waveguide 120 by way of optical fiber receptacle 122.

Continuing on, the multi-channel ROSA arrangement 106 includes a demultiplexing device 124, e.g., an arrayed waveguide grating (AWG), a photodiode (PD) array 128, and an amplification circuitry 130, e.g., a transimpedance amplifier (TIA). An input port of the demultiplexing device 124 may be optically coupled with a receive waveguide 134, e.g., an optical fiber, by way of an optical fiber receptacle 136. An output port of the demultiplexing device 124 may be configured to output separated channel wavelengths on to the PD array 128. The PD array 128 may then output proportional electrical signals to the TIA 130, which then may be amplified and otherwise conditioned. The PD array 128 and the transimpedance amplifier 130 detect and convert optical signals received from the fiber array 133 into electrical data signals (RX_D1 to RX_D4) that are output via the receive connecting circuit 132. In operation, the PD array 128 may then output electrical signals carrying a representation of the received channel wavelengths to a receive connecting circuit 132 by way of conductive traces 119 (which may be referred to as conductive paths).

Referring to FIG. 2, a lens clip 200 is shown consistent with aspects of the present disclosure. The lens clip 200 may be utilized in each of the laser arrangements 110 discussed above. As shown, the lens clip 200 includes a body 202 defined by a plurality of sidewalls. In particular, the body 202 includes a base portion 204 (or base 204) that extends from a first end 206-1 to a second end 206-2. The body 202 further defines first and second arms 208-1, 208-2 that extend from the base portion 204 substantially parallel relative to each other. As shown, the first arm 208-1 extends proximate to the first end 206-1 of the base portion 204 and the second arm 208-2 extends proximate to the second end 206-2.

The first and second arms 208-1, 208-2 may be integrally formed with the body 202 as a single piece or may be formed as multiple pieces. The lens clip 200 may be formed from glass (e.g., silica), plastic, or other suitably rigid material. In an embodiment, at least a portion of the lens clip 200 is formed from a substantially transparent (or light transmissive material). As used herein, the term substantially transparent material refers to material that allows at least 80% of incident light to pass through, and preferably, 80-100% of ultraviolet wavelengths in the 10 nm to 400 nm range.

A plurality of inner mating surfaces 212-1, 212-2 and 212-3 collectively provide an optical lens slot/recess 214. In particular, the first and second mating surfaces 212-1, 212-2 provided by the first and second arms 208-1, 208-2, respectively, extend substantially transverse relative to the third mating surface 212-3 provided by the base. As discussed in greater detail below with regard to FIG. 5, the optical lens slot 214 may be utilized to securely hold an optical lens 216 when the same is being securely coupled to an associated TOSA housing/substrate. To this end, the first, second and third mating surfaces 212-1, 212-2, and 212-3 can extend substantially transverse relative to a mounting surface 221 of the substrate when mounted thereto (See FIG. 5). The body 202 further includes at least one substrate mating surface 211 for coupling with the mounting surface 221 of the substrate 220.

FIG. 3 illustrates a top-down view of the lens clip 200 consistent with an embodiment of the present disclosure. As shown, the optical lens slot 214 is substantially U-shaped based on the geometry of the base portion 204, and the first and second arms 208-1, 208-2. The first and second arms 208-1, 208-2 extend at least partially across the cross-wise width of the optical lens 216. As further shown, width W1 of the optical lens slot 214 measures slightly larger than the width of the optical lens 216. As a result, first and second air gaps 218-1, 218-2 can be provided to provide 1-100 microns of space/distance between the inner mating surfaces 212-1, 212-2 and surfaces of the optical lens 216. An epoxy, such as a UV-curing optical adhesive may be disposed/dispensed into the air gaps 218-1, 218-2, which is shown and discussed in greater detail below with regard to FIG. 5.

Continuing on, FIG. 4 shows an embodiment of the lens clip 200 substantially similar to that of the embodiment shown in FIG. 3, and for this reason the description of which will not be repeated for brevity. However, the embodiment shown in FIG. 4 includes an optional third air gap 218-3 formed between the third mating surface 212-3 of the base portion 204 and a corresponding surface of the optical lens 216. In any event, the body of the optical lens 216 may form a friction fit within the optical lens slot 214 to ensure the optical lens 216 is held at a predetermined vertical orientation. The predetermined vertical orientation can result in a gap 227 (See FIG. 5) forming between the bottom surface of the optical lens 216 and the mounting surface 221 of the substrate 220. Note, in some cases no intentional air gap may be provided between lens mating surfaces of the lens clip 200 and the optical lens 216. In these cases, adhesives such as the UV-curing optical adhesive may be disposed on the lens mating surfaces and/or the corresponding surfaces of the optical lens 216 to cause the adhesive to fill interstitial spaces therebetween.

Figure 5:
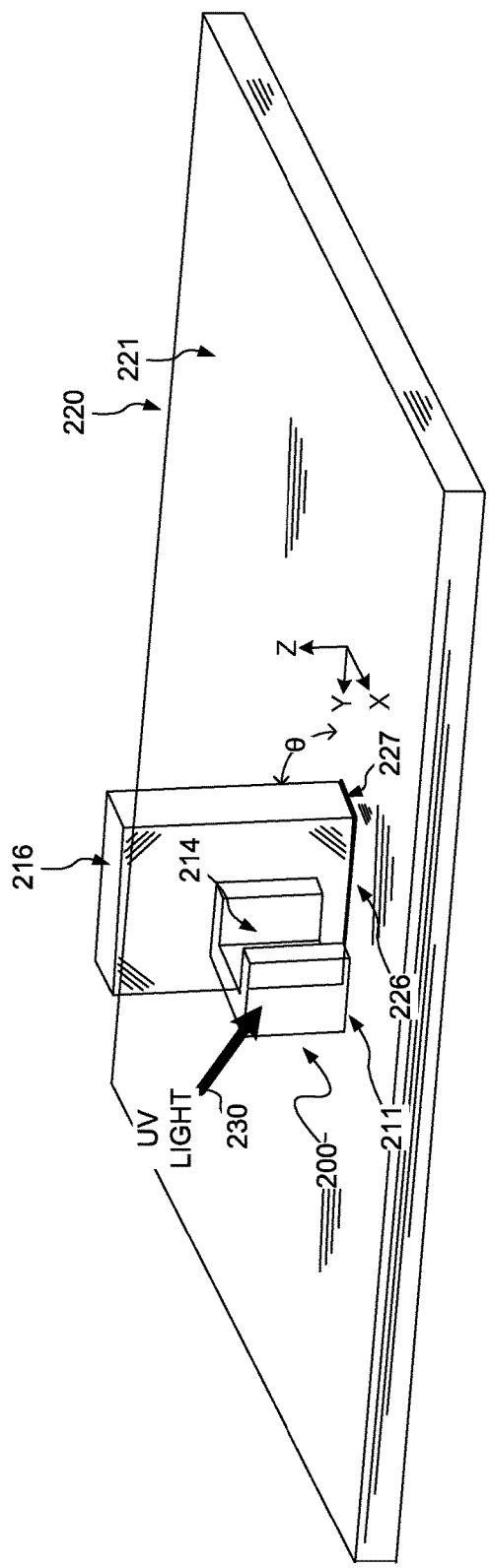
FIG. 5 shows a perspective view of a partially-assembled TOSA arrangement that uses the lens clip of FIG. 2, in accordance with an embodiment of the present disclosure.
Figure 6:
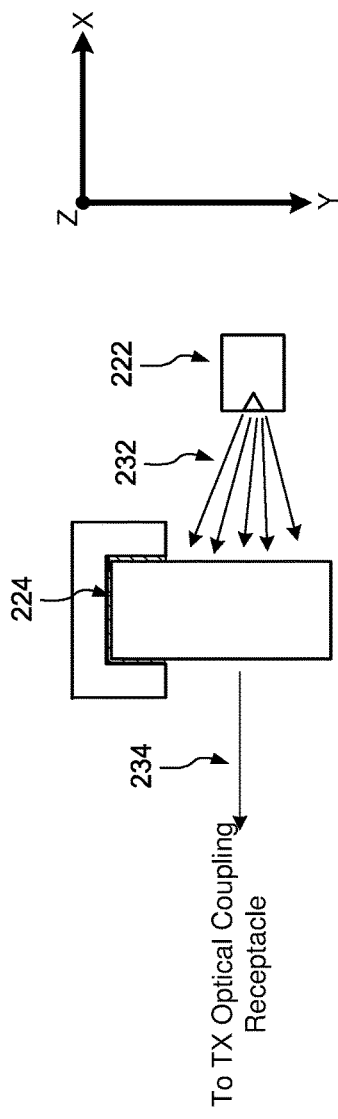
FIG. 6 shows an example top-down view of the lens clip of FIG. 2 optically aligned with a laser diode, in accordance with an embodiment of the present disclosure.

FIGS. 5-6 show an example embodiment of the lens clip 200 after being coupled to a substrate 220. As shown, the lens clip 200 is supported by the mounting surface 221 of the substrate 220. In this embodiment, the substrate mating surface 211 of the lens clip 200 is substantially planer and sits flush against the mounting surface 221. Therefore, the substrate mounting surface 211 may be accurately referred to as an alignment/guide surface, whereby mounting of the same against the mounting surface 221 ensures that angle θ of the optical lens 216 disposed within the optical lens slot 214 is substantially 90 degrees relative to the mounting surface 221. Stated more simply, proper vertical/upright orientation of the optical lens 216 can be achieved by simply ensuring that the substrate mounting surface 211 of the lens clip 200 sits substantially flush against the mounting surface 221 of the substrate 220. The provided example of angle θ being substantially 90 degrees should not be construed as limiting. In other embodiments, different angles may be achieved simply by configuring the optical lens slot 214 to have the desired angle.

As further shown, the optical lens slot 214 securely holds the optical lens at a predetermined position along the X, Y and Z axis. Accordingly, alignment about the X and Y axis may be achieved simply by disposing and coupling the lens clip 200 at a desired position on the substrate 220 using, for example, an adhesive (e.g., an epoxy, UV-curing optical adhesive, and so on). Next, the optical lens 216 may be inserted into the optical lens slot 212 to bring the optical lens 216 into alignment with the laser diode 222 along the X and Y axis as shown in FIG. 6.

As further shown, at least a first layer of UV-curing optical adhesive 224 may be applied to the mating surfaces 212-1, 212-2, and/or 212-3 (FIG. 2) of the lens clip 200 before or after the optical lens 216 gets inserted into the optical lens slot 214. Application of the first layer of UV-curing optical adhesive 224 may also include disposing the same on to the substrate mounting surface 211. Alternatively, or in addition, a second layer of UV-curing optical adhesive 226 may be disposed between an interface of a bottom surface of an optical lens 216 and the mounting surface 221 of the substrate 220. In an embodiment, the optical lens slot 214 may be configured to form a friction fit with the optical lens 216 and hold the same above the substrate 220 to form a relatively small gap 227 (e.g., measuring a few microns) between the surface defining the bottom of the optical lens 216 and the mounting surface 221 of the substrate 220. The friction fit may advantageously prevent the optical lens 216 from being, in a general sense, "pulled" towards the substrate 220 by the second layer of UV-curing optical adhesive 226 during curing. Likewise, the formed gap 227 may be advantageously used to ensure there is sufficient space to accommodate the second layer of UV-curing optical adhesive 226.

In any event, UV light 230 may then be emitted through the base 204 and/or first and second arms 208-1, 208-2 of the body 202 of the lens clip 200 e.g., from an external UV light source (not shown), to cause the first and/or second layer of UV-curing optical adhesives 224, 226 to cure. The cured UV-curing optical adhesives may therefore be used to securely attach the lens clip 200 to the mounting surface 221, the lens clip 200 to the optical lens 216, the optical lens 216 to the mounting surface 221 of the substrate 220, or any combination thereof.

In cases where the first layer of UV-curing optical adhesive 224 is utilized, the UV-curing optical adhesive may shrink/change structural shape during hardening, and as a result, cause displacement of the optical lens 216. However, shrinkage of the first layer of UV-curing optical adhesive 224 causes negligible displacement as the first layer of UV-curing optical adhesive 224 can shrink uniformly about two or more sides of the optical lens 216, thus effectively canceling out displacement.

Likewise, in an embodiment, curing the second layer of UV-curing optical adhesive 226 does not cause displacement of the optical lens 216 relative to the substrate 220 along the X and Y axis by virtue of surfaces of the optical lens 216 being in direct contact with the mating surfaces 212-1 to 212-2 of the optical lens slot 214. Instead, displacement occurs along the Z axis, which does not impact optical alignment with the laser diode 222 as this displacement simply amounts to relatively small vertical up/down shift of the optical lens 216.

Accordingly, curing of the first layer of UV-curing optical adhesives 224 and/or second layer of UV-curing optical adhesives 226 results in the optical lens 216 maintaining a predetermined position for optical alignment with the laser diode 222. Emitted channel wavelengths 232 from the emission face of the laser diode therefore intersects with the optical lens 216 for focusing/filtering purposes. The focused channel wavelengths 234 may then be output on to an external transmit waveguide, e.g., transmit fiber optic 120 of FIG. 1, by way of an optical coupling receptacle.

Figures 7A, 7B:
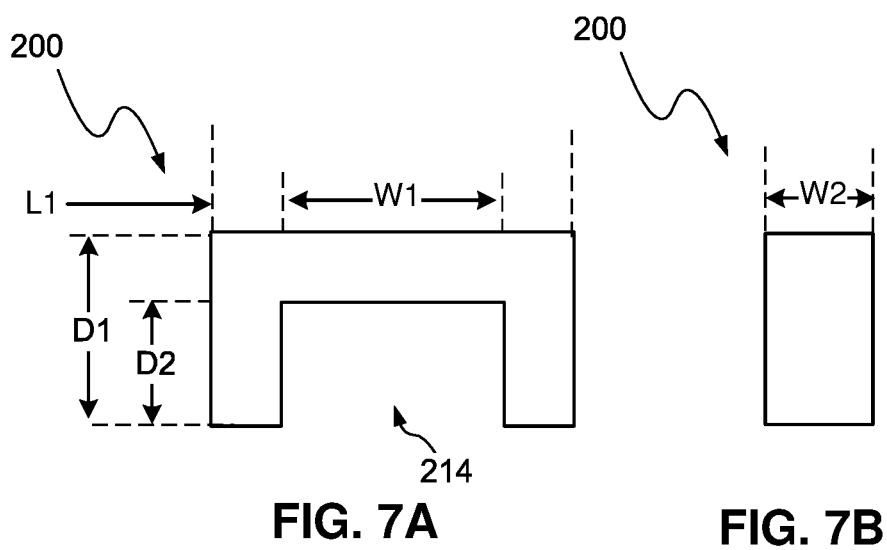
FIGS. 7A-7B show additional aspects of the lens clip of FIG. 2, in accordance with an embodiment of the present disclosure.

Turning to FIGS. 7A-7B, one example embodiment of the lens clip 200 illustrates the same can include an overall length L1 of about 1020 microns. Each arm may extend an overall distance D1 of about 560 microns. The ratio of the overall length L1 relative to the overall distance D1 of each arm may be approximately 1:2. The portion of each arm defining the optical lens slot 214 extend a distance D2 of about 360 microns. The optical lens slot 214 can include a width W1 of about 620 microns±10 microns. Therefore, the ratio of W1 relative to D2 is also about 2:1. The overall width W2 of the lens clip 200 may measure about 300 microns.

In accordance with an aspect of the present disclosure a lens clip for use in an optical subassembly module is disclosed, the lens clip comprising a base defined by a plurality of sidewalls, the base providing at least one substrate mating surface for mounting to a substrate, and at least first and second arms extending from the base, the first and second arms extending substantially parallel relative to each other and defining at least a portion of an optical lens slot, the optical lens slot for receiving at least a portion of an optical lens and securely holding the optical lens at a predetermined position to ensure optical alignment of the optical lens relative to an associated optical component in order to mitigate post-annealing shift.

In accordance with another aspect of the present disclosure an optical transceiver is disclosed. The optical transceiver comprising a transceiver housing, at least one optical transmitter subassembly (TOSA) arrangement disposed in the transceiver housing, the at least one TOSA arrangement comprising a substrate providing at least one mounting surface, a laser diode mounted to the at least one mounting surface of the substrate, the laser diode to emit an associated channel wavelength, a lens clip mounted to the at least one mounting surface of the substrate, the lens clip having a base that defines an optical lens slot configured to hold an optical lens at a predetermined position on the substrate to optically align the optical lens with the laser diode, an optical lens at least partially disposed in the optical lens slot of the lens clip, and at least one layer of ultraviolet-curing (UV-curing) optical adhesive disposed between an interface of the optical lens and the at least one mounting surface of the substrate, an optical receiver subassembly (ROSA) disposed in the transceiver housing.

In accordance with another aspect of the present disclosure a method for mounting and optically aligning an optical lens in an optical subassembly module is disclosed. The method comprising mounting a lens clip to a substrate, the lens clip providing an optical lens slot to at least partially receive an optical lens, inserting an optical lens into the optical lens slot, disposing a first layer of an ultraviolet-curing (UV-curing) optical adhesive at an interface between the optical lens and the substrate, and emitting UV light on to the first layer of UV-curing optical adhesive to cause the UV-curing optical adhesive to attach the optical lens to the substrate, and in response to emitting the UV light on to the first layer of the UV-curing optical adhesive, mitigating post-anneal shifting of the optical lens based on the optical lens slot.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A lens clip for use in an optical subassembly module, the lens clip comprising:
   a base defined by a plurality of sidewalls, the base providing at least one substrate mating surface for mounting to a substrate;
   at least first and second arms extending from the base, the first and second arms extending substantially parallel relative to each other and defining at least a portion of an optical lens slot, the optical lens slot for receiving at least a portion of an optical lens and securely holding the optical lens at a predetermined position to ensure optical alignment of the optical lens relative to an associated optical component in order to mitigate post-annealing shift;
   wherein the base is formed from a substantially transparent material, and wherein the first and second arms extend along surfaces of the optical lens configured to receive and pass channel wavelengths from the associated optical component; and
   wherein the optical lens slot is defined at least in part by first and second inner mating surfaces provided by the first and second arms, respectively, and wherein the optical lens slot is further defined by a third inner mating surface provided by the base, and wherein the first, second and third inner mating surfaces are configured to directly contact one or more surfaces of the optical lens to hold the optical lens at the predetermined position via friction fit.

2. The lens clip of claim 1, wherein the substantially transparent material allows the base to pass at least 80% of incident ultraviolet (UV) light therethrough for purposes of exposing a UV-curing optical adhesive to the UV light.

3. The lens clip of claim 1, wherein the first and second arms are integrally formed with the base as a single piece.

4. The lens clip of claim 1, wherein the first and second inner mating surfaces extend substantially transverse relative to the third inner mating surface and generally form a U-shape, and wherein the first, second and third inner mating surfaces extend substantially transverse from the substrate when the base of the lens clip is coupled thereto.

5. The lens clip of claim 1, wherein the optical lens slot is configured to hold the optical lens at a predetermined angle relative to a mounting surface of the substrate, the predetermined angle being substantially 90 degrees when the base of the lens clip is mounted to the mounting surface of the substrate.

6. The lens clip of claim 5, wherein the optical lens slot holds the optical lens at the predetermined angle relative to the mounting surface based at least in part on the substrate mounting surface of the base being substantially flat and disposed flush against the mounting surface of the substrate.

7. An optical transceiver, the optical transceiver comprising:
   a transceiver housing;
   at least one optical transmitter subassembly (TOSA) arrangement disposed in the transceiver housing, the at least one TOSA arrangement comprising:
   a substrate providing at least one mounting surface;
   a laser diode mounted to the at least one mounting surface of the substrate, the laser diode to emit an associated channel wavelength;
   a lens clip mounted to the at least one mounting surface of the substrate, the lens clip having a base that defines an optical lens slot configured to hold an optical lens at a predetermined position on the substrate to optically align the optical lens with the laser diode;
an optical lens at least partially disposed in the optical lens slot of the lens clip; and
at least one layer of ultraviolet-curing (UV-curing) optical adhesive disposed between an interface of the optical lens and the at least one mounting surface of the substrate;
an optical receiver subassembly (ROSA) disposed in the transceiver housing.

8. The optical transceiver of claim 7, wherein at least a portion of the lens clip is substantially transparent to permit ultraviolet (UV) wavelengths to be passed therethrough to cause the UV-curing optical adhesive to cure.

9. The optical transceiver of claim 7, wherein the optical lens slot is provided at least in part by first and second arms extending from the base of the lens clip.

10. The optical transceiver of claim 9, wherein the first and second arms are integrally formed with the base of the lens clip as a single piece.

11. The optical transceiver of claim 9, wherein the optical lens slot includes first and second inner mating surfaces provided by the first and second arms, respectively, and wherein the optical lens slot includes a third inner mating surface provided by the base of the lens clip, and wherein the first, second and third inner mating surfaces are configured to directly contact one or more surfaces of the optical lens to hold the optical lens at the predetermined position.

12. The optical transceiver of claim 11, wherein the first and second inner mating surfaces extend substantially transverse relative to the third inner mating surface and generally form a U-shape, and wherein the first, second and third inner mating surfaces extend substantially transverse from the substrate.

13. The optical transceiver of claim 7, wherein the optical lens slot is configured to hold the optical lens at a predetermined angle relative to the at least one mounting surface of the substrate, the predetermined angle being substantially 90 degrees.

14. A method for mounting and optically aligning an optical lens in an optical subassembly module, the method comprising:
mounting a lens clip to a substrate, the lens clip providing an optical lens slot to at least partially receive an optical lens;
inserting an optical lens into the optical lens slot;
disposing a first layer of an ultraviolet-curing (UV-curing) optical adhesive at an interface between the optical lens and the substrate; and
emitting UV light on to the first layer of UV-curing optical adhesive to cause the UV-curing optical adhesive to attach the optical lens to the substrate; and
in response to emitting the UV light on to the first layer of the UV-curing optical adhesive, mitigating post-anneal shifting of the optical lens based on the optical lens slot.

15. The method of claim 14, wherein emitting UV light on the first layer of UV-curing optical adhesive further includes emitting the UV light through a substantially transparent portion of the lens clip.

16. The method of claim 14, the method further comprising:
disposing a second layer of UV-curing optical adhesive at an interface between the lens clip and the substrate; and
emitting UV light on to the second layer of UV-curing optical adhesive.

* * * * *